(12) United States Patent
Maddox (10) Patent No.: US 7,744,365 B2
(45) Date of Patent: Jun. 29, 2010

(54) APPARATUS FOR BLOW MOLDING ASEPTIC CONTAINERS

(75) Inventor: A. Dale Maddox, Tecumseh, MI (US)

(73) Assignee: Milacron LLC, Batavia, OH (US)

( * ) Notice: Subject to any disclaimer, the term of this patent is extended or adjusted under 35 U.S.C. 154(b) by 945 days.

(21) Appl. No.: 11/381,819

(22) Filed: May 5, 2006

(65) Prior Publication Data

US 2006/0249887 A1 Nov. 9, 2006

Related U.S. Application Data

(60) Provisional application No. 60/678,565, filed on May 6, 2005.

(51) Int. Cl.
*B29C 49/48* (2006.01)

(52) U.S. Cl. .................... 425/522; 425/535

(58) Field of Classification Search ................ 425/522, 425/524, 535; 264/524, 525, 534
See application file for complete search history.

(56) References Cited

U.S. PATENT DOCUMENTS

| | | | |
|---|---|---|---|
| 3,271,490 A * | 9/1966 | Cattaneo | 264/519 |
| 3,814,783 A * | 6/1974 | Dardaine et al. | 264/525 |
| 3,911,071 A * | 10/1975 | Naumann | 425/524 |
| 4,026,982 A * | 5/1977 | Dardaine et al. | 264/525 |
| 4,079,111 A | 3/1978 | Uhlig | |
| 4,119,394 A * | 10/1978 | Cary | 425/390 |
| 4,905,450 A * | 3/1990 | Hansen et al. | 53/410 |
| 4,926,613 A * | 5/1990 | Hansen | 53/433 |
| 5,060,453 A * | 10/1991 | Alberghini et al. | 53/440 |
| 5,068,075 A | 11/1991 | Dundas et al. | |
| 5,122,327 A * | 6/1992 | Spina et al. | 264/534 |
| 5,687,550 A | 11/1997 | Hansen et al. | |
| 6,277,321 B1 * | 8/2001 | Vailliencourt et al. | 264/534 |

FOREIGN PATENT DOCUMENTS

| | | |
|---|---|---|
| JP | 57-0059725 | 4/1982 |
| WO | 0189940 | 11/2001 |
| WO | 2004009329 | 1/2004 |

OTHER PUBLICATIONS

Patent Abstracts of Japan, vol. 006, No. 138(M-145) Jul. 27, 1982.
International Search Report of International Searching Authority in Pending PCT Patent Application PCT/US2006/017301 Mailed Mar. 22, 2007.

* cited by examiner

*Primary Examiner*—Robert B Davis
(74) *Attorney, Agent, or Firm*—John W. Gregg (57) ABSTRACT

An apparatus and method for blow molding and sealing an aseptic container. A pair of mold halves, including inner surfaces that when closed define a mold cavity, clamp about an extruded parison. The parison is inflated by high pressure blow air into conformity with the shape of the mold cavity. An evacuation device applies a force to an exterior portion of the blow molded container causing the portion to deform or flex inwardly, thereby reducing the internal volume and evacuating air from the blow molded container. A sealing tool thereafter causes the blow molded container to be sealed while the container is in the reduced volume condition. Upon removal from the mold assembly and cooling, the container returns to the desired shape.

14 Claims, 6 Drawing Sheets

APPARATUS FOR BLOW MOLDING ASEPTIC CONTAINERS

CROSS REFERENCE TO RELATED APPLICATION

This application claims, under 35 U.S.C. 119(e), the benefit of provisional patent application No. 60/678,565, filed May 6, 2005.

BACKGROUND

1. Technical Field

This invention relates to sealed, blow molded aseptic containers and to a method and apparatus for forming such containers.

2. Description of Known Technology

The production of aseptic containers requires that parisons be blown with high pressure sterile blow air, vented and, when the containers will not be immediately filled (as is typically the case), sealed to preserve the sterility of the empty container's interior. One problem with blow molding such containers is that, after sealing, the plastic of the bottle cools and shrinks. This may also result in a warming of the air within the container. As container shrinks, the volume of trapped air within the container does not. This can cause deformation in the shape of the container, particularly its side walls. If the air within the container warms and thus expands, the deformation in the shape of the container can be further exacerbated.

To prevent the causes of deformation, the volume or pressure of the air remaining in the container at the time of sealing must be reduced. Known systems have evacuated the blow air out of the container prior to sealing by using a vacuum. The vacuum can be obtained by using a vacuum pump connected to the interior of the container or by using a venturi, with its low pressure inlet port connected to the interior of the container.

As seen from the above, there exists a need for a simplified method and apparatus to evacuate the blow air from the containers prior to sealing, which would eliminate the need to use a vacuum and/or venturi.

SUMMARY

In achieving the above and overcoming the enumerated and other limitations of the prior art, the present invention provides an apparatus whereby a parison of extruded plastic resin is clamped between a pair of mold halves and then blow molded into the desired shape of the cavity defined by the mold halves. Prior to a sealing bar being used to seal off the blow molded container, a force is applied to the exterior of the container, which may still be located within the cavity of the mold. This force deforms the side walls and reduces the volume of air located within the container. Once the volume has been reduced, the sealing arm is advanced, pinching a portion of the plastic closed, to seal off the container. If evacuation is performed while the container is located in the mold, the container is thereafter removed from the mold and allowed to cool to ambient temperatures. The reduced volume at the time of sealing of the container is chosen such that, upon cooling to ambient temperatures, the sides of the container are returned to the desired final or end shape as a result of the shrinking of the container and/or warming of the air in the container.

In one aspect of the present invention, force is applied to the exterior of the container by the application of pressurized air to compress the side wall of the container.

In another aspect of the present invention, a force is applied to the exterior of the container by the application of a mechanical member advanced by an actuator so as to compress the sides of the container.

In still another aspect, the present invention provides a method for forming a sealed, hollow aseptic container from a parison of thermoplastic material, including the step of evacuating the blow air from the container prior to sealing the container through the application of force to the exterior of the blown container.

DETAILED DESCRIPTION

The following description of the preferred embodiments is not intended to limit the scope of the invention to these preferred embodiments, but rather to enable any person skilled in the art to make and use the invention.

Figure 1:
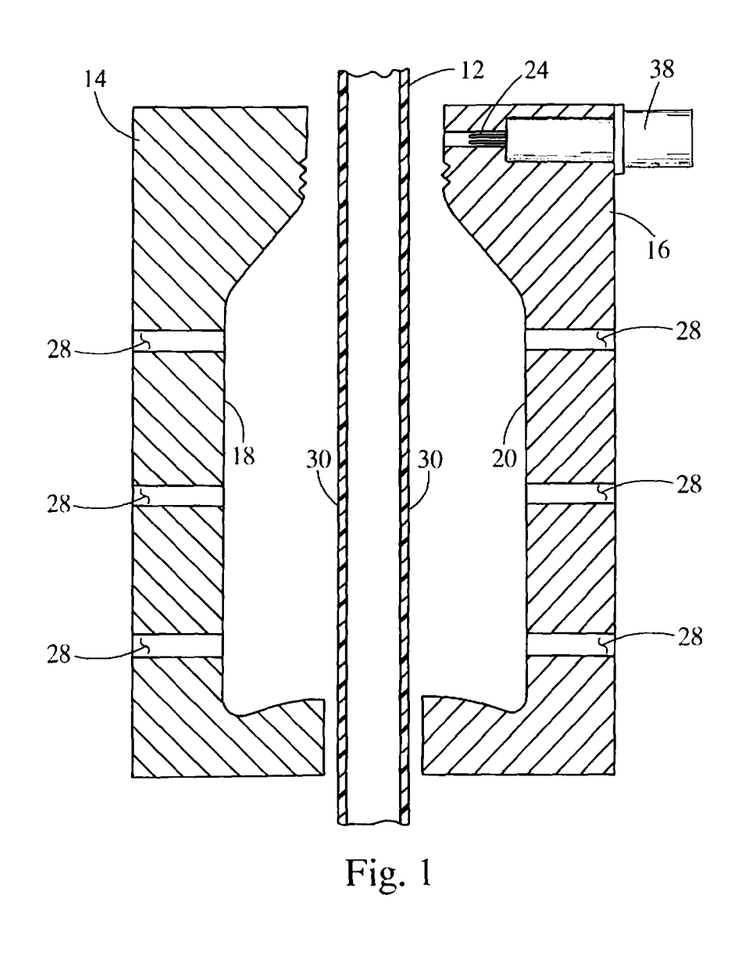
FIG. 1 is a sectional view of a mold assembly prior to the mold being clamped onto a parison.
Figure 2:
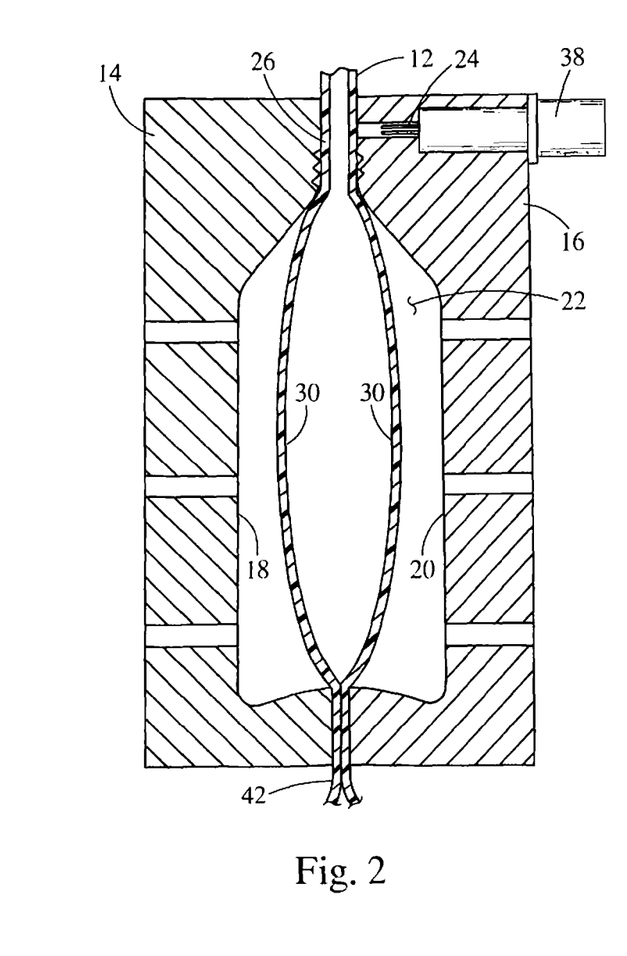
FIG. 2 is a sectional view of the mold assembly after the mold halves have been clamped onto the parison.

Referring now to the drawings, extrusion blow molded plastic containers 10 are typically formed from a parison 12 of hot sterile resin (high density polyethylene resin, although other suitable resins can be used) extruded between an open pair of complimentary mold halves 14, 16, as shown in FIGS. 1 and 2. The mold halves 14, 16 include inner surfaces 18, 20 defining a mold cavity 22 in the shape of the desired container.

Figure 3:
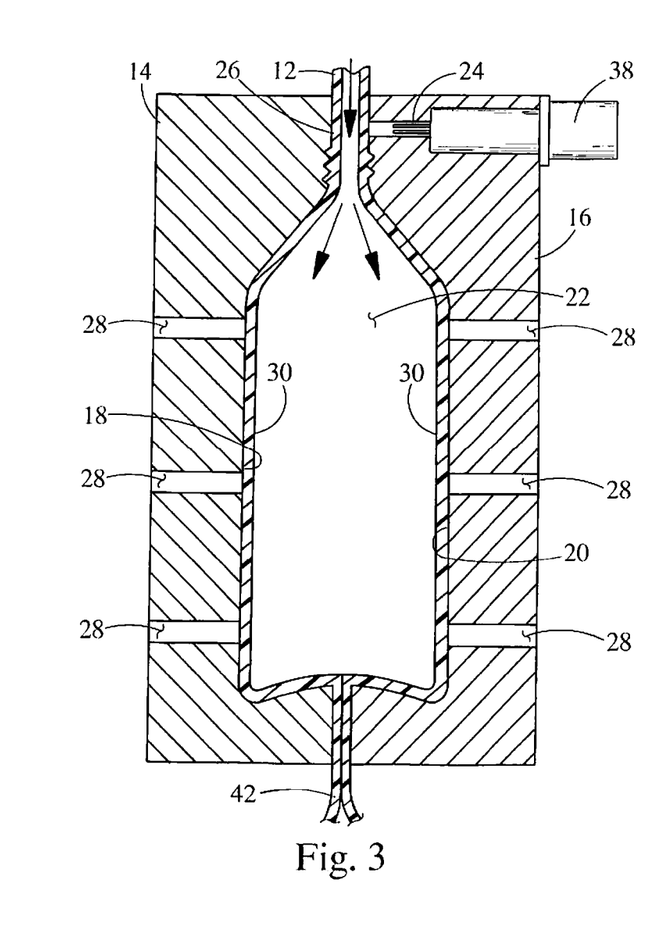
FIG. 3 is a sectional view of the closed mold assembly wherein air has been used to inflate the container.

When the mold halves 14, 16 are closed, sterile blow air is blown into the parison 12 either directly or via a blow pin (not shown), thereby inflating the parison 12 such that the parison 12 expands outward against the inner surfaces 18, 20 of the mold cavity 22, as shown in FIG. 3. Compared to the temperature of the resin, the mold halves 14, 16 are cold (and may actually be actively cooled by water or another suitable medium) so that the exterior skin of the inflated hot plastic is quickly cooled and begins hardening, thus forming and maintaining the general shape of the container 10.

Figure 9:
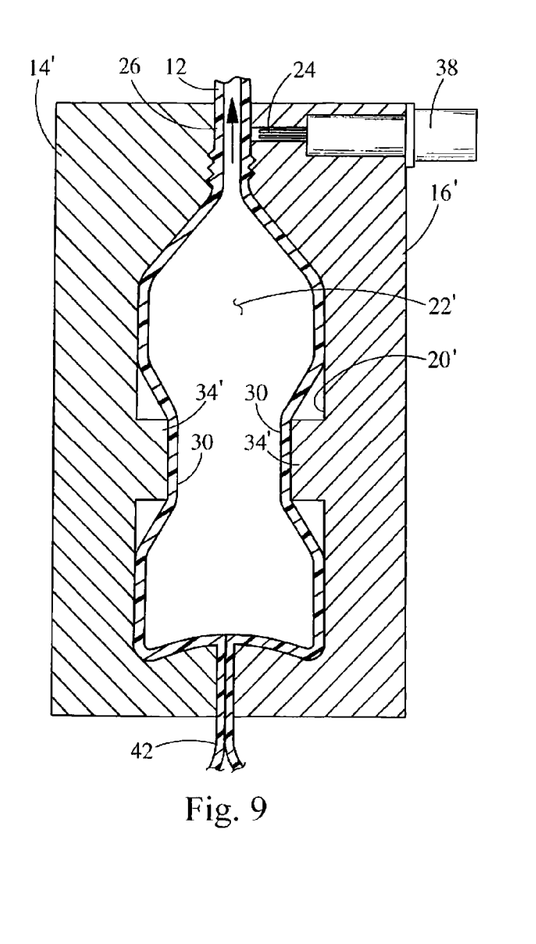
FIG. 9 is a sectional view of an alternate embodiment and construction of the present invention wherein fixed evacuation bars are utilized in an evacuation station, subsequent to removal of the container from the mold assembly.

After the container 10 and associated structures, a sealing neck portion 26, etc., are blow molded, the sterile pressurized blow air is evacuated. This evacuation reduces the volume of the container and may reduce the pressure in the container (to about negative 10-20 inches of water). Once reaching the appropriate reduced volume and/or negative pressure, a sealing tool 24, mounted within one or both of the mold halves 14, 16, is moved by a drive 38 to engage and collapse a sealing neck portion 26 of the container 10. The collapsing of the sealing neck portion 26 results in the sealing the container 10, as shown in FIG. 9 and as more fully discussed below.

There are various ways to facilitate evacuation of the blow air from the container 10 according to the present invention. In one construction, at least one of the mold halves 14, 16 includes a device that applies a force that deforms the blow molded container 10, thereby reducing an internal volume of the blow molded container 10 and forcing the blow air to be evacuated from the interior of the blow molded container 10. In another construction, the unsealed, blow molded container 10 is removed from the mold halves 14, 16 and transferred to a secondary or evacuation station where evacuation is performed and the container 10 sealed. In both constructions, the evacuation force is applied to the exterior of the container 10.

Figure 4:
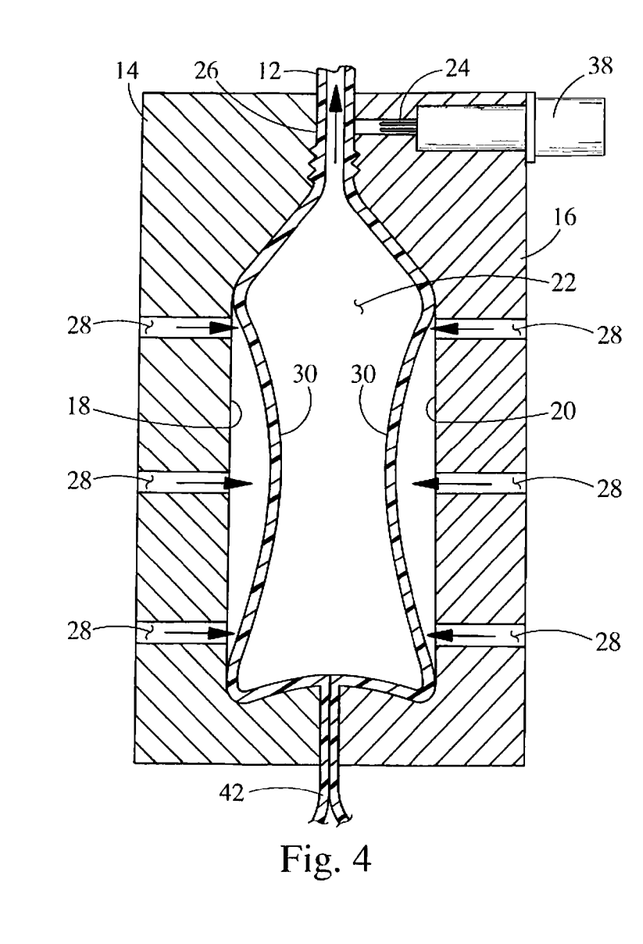
FIG. 4 is a sectional view of a mold assembly wherein air has been introduced, through passages in the mold halves, so as to cause the sides of the blow molded container to flex inward, thereby reducing the interior volume of the blow molded container and causing air to be evacuated from the interior of the blow molded container.

In one embodiment of the first construction, as particularly seen in FIG. 4, each of the mold halves 14, 16 includes a plurality of air passages 28 (not drawn to scale) in fluid communication with the mold cavity 22. The air passages allow pressurized air, supplied from a pressurized source P, to enter the mold cavity 22 after the container 10 has been blow molded. The air enters between the sides 30 of the container 10 and mold cavity 22, thereby causing the sides 30 of the container 10 to flex inward. This reduces the interior volume of the container 10 and forces the evacuation of a portion of the blow air therefrom.

Figure 5:
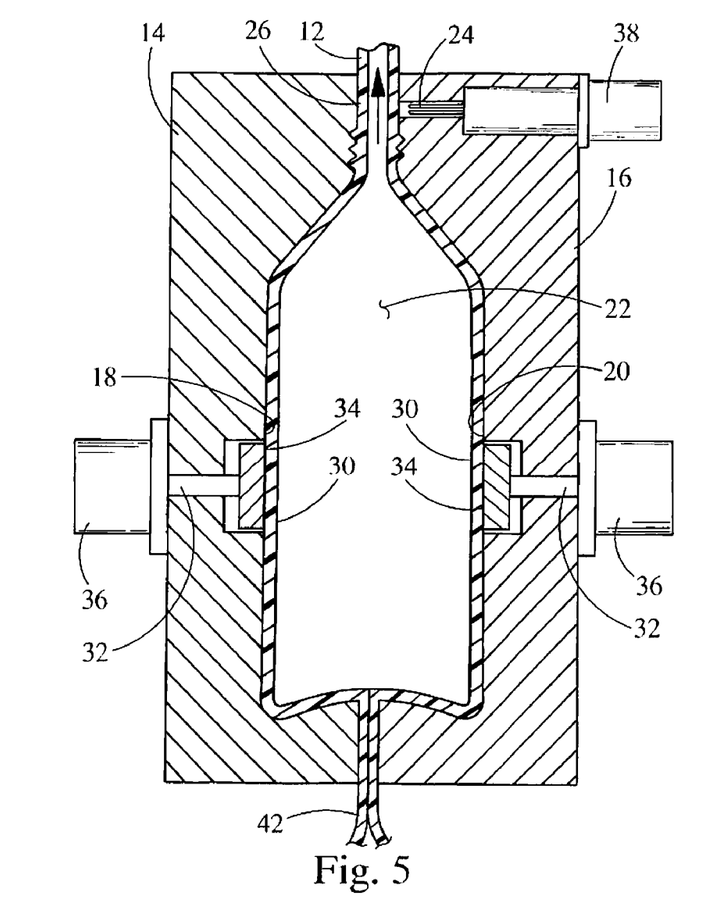
FIGS. 5 and 6 are sectional views of an alternative embodiment wherein a movable slide member causes the reduction of the interior volume of the blow molded container such that air is evacuated from the blow molded container.
Figure 6:
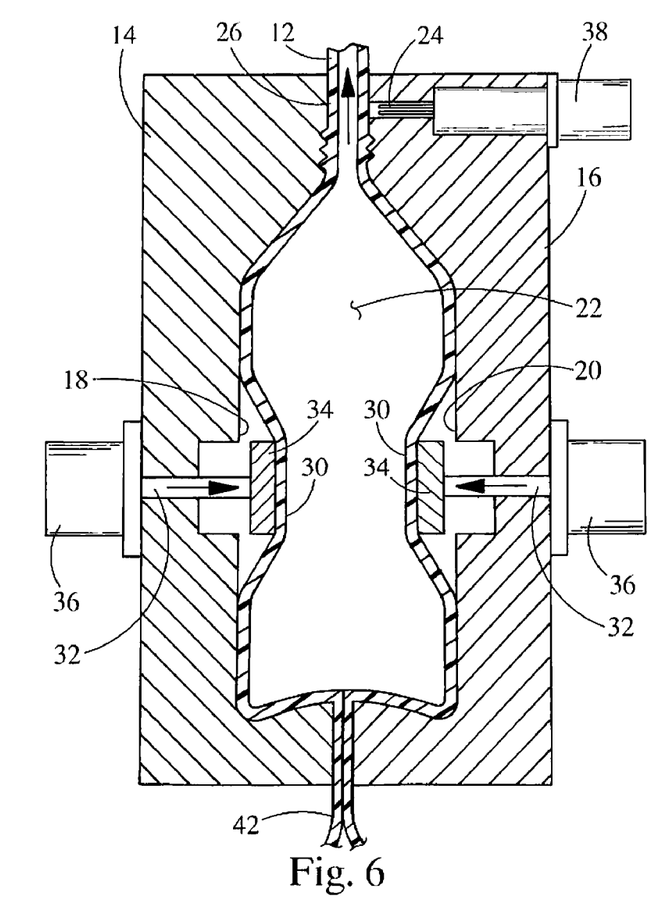

Referring to FIGS. 5 and 6, in another embodiment each of the mold halves 14, 16 include a moveable slide 32. Each moveable slide 32 includes a distal end 34 that is preferably contoured to match the inner surfaces 18, 20 of the mold cavity 22. An actuator 36 moves the slides 32 between a retracted position and an extended position. In the retracted position, the distal ends or interior surfaces 34 of the slides 32 are aligned with the inner surfaces 18, 20 of the mold cavity 22, as shown in FIG. 5. In the extended position, the distal ends 34 of the slides 32 are extended into the mold cavity 22. When extended, the distal ends 34 of the slides 32 engage the sides 30 of the container 10 causing the sides 30 of the container 10 to flex inward, thereby reducing the interior volume of the container 10 and forcing the evacuation of a portion of the blow air therefrom, as shown in FIG. 6.

The cross sectional shape of the slides 32 may be any one of a number of desired shapes, based on the design of the container 10. For example, the slides 32 may be generally square or rectangular (oriented vertically or horizontally with respect to the container 10) in cross sectional shape, with or without rounded corners (the former being preferred). Such shapes may be particularly beneficial wherein the side wall that is being deflected is planar or paneled in shape. Alternatively, the cross sectional shape of the slides 32 may be round or otherwise shaped. A round cross sectional shape, however, has benefits with regard to strength and ease of manufacture.

Figure 7:
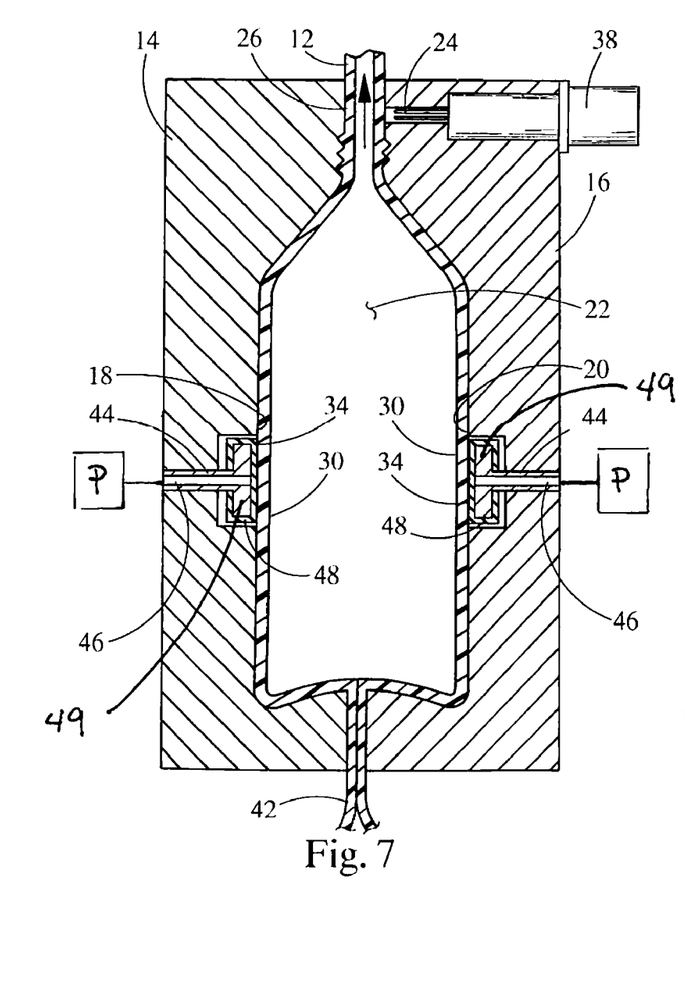
FIGS. 7 and 8 are sectional views of yet another embodiment wherein an inflatable membrane is expanded outward and engages the sides of the container, thereby reducing the interior volume of the blow molded container and causing air to be evacuated from the blow molded container.
Figure 8:
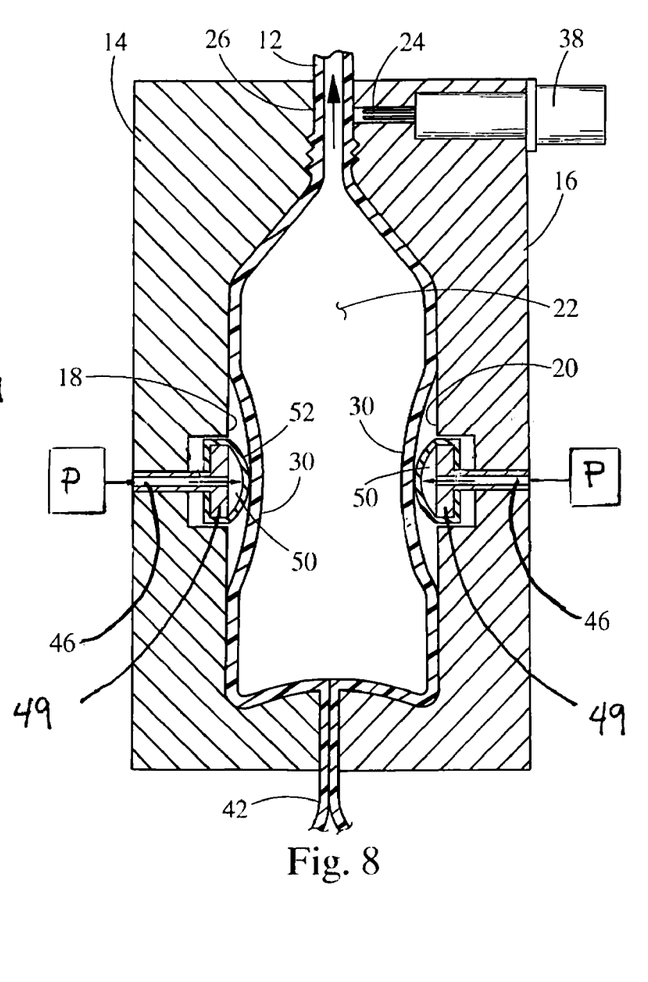

Additionally, the location of the slides 32 relative to the side wall 30 of the container 10 need not be necessarily centered with respect to the side wall 30. It is anticipated that the precise position of the slides 32 will be dependent on the particular design and overall shape of the container 10. As those skilled in the art will appreciate, tuning of the location of the slides 32 may therefore be required Referring to FIGS. 7 and 8 in yet another embodiment, each of the mold halves 14, 16 includes an inflatable membrane 48. The inflatable membrane 48 is provided about or over a plug 49 coupled to a source of pressurized air (P) via a passageway 46. When the inflatable membrane 48 is not inflated, a surface of the inflatable membrane 48 is flush with the inner surfaces 18, 20 of the mold cavity 22, as shown in FIG. 7. When the membrane 48 is inflated, as designated at 50, the inflatable membrane 48 expands outward from the plug 49 into the mold cavity 22 and engages the sides 30 of the container 10. This causes the sides 30 of the container 10 to be flexed inward, thereby reducing the interior volume of the container 10 and forcing the evacuation of a portion of the blow air therefrom, as shown in FIG. 8.

The three disclosed embodiments of the first construction are also applicable to the second construction where evacuation and sealing take place after removal of the blow molded container 10 from the two mold halves 14, 16. In such a construction, after blow molding of the container 10, the container is transferred from the mold halves 14, 16 to an evacuation or secondary station. In the evacuation station, evacuation tooling, having an appropriately sized central cavity, is closed about the blow molded container 10 and evacuation caused to occur.

In one embodiment of the second construction, the evacuation tooling includes a plurality of air passages in fluid communication with the cavity. The air passages allow pressurized air, supplied from a pressurized source P, to enter the cavity between the sides 30 of the container 10 and cavity. This applies a force to the exterior and the sides 30 of the container 10 causing them to flex inward, which results in a reduction in the interior volume of the container 10 and forces the evacuation of a portion of the blow air therefrom.

In another embodiment, the evacuation tooling includes one or more moveable slides associated with its cavity. It is envisioned that the slides would have a construction similar to that previously discussed in connection with the first construct of the invention. For this reason, it is not believed that further discussion of the construction of the moveable slides is necessary. Yet another embodiment would include inflatable membranes as also previously discussed. Again, the incorporation of inflatable membranes would have similar to that previously discussed and further discussion is not believed to be warranted herein.

In a fourth embodiment, seen in FIG. 9, the evacuation tooling 14', 16' employs fixed evacuation bars 34'. The fixed evacuation bars 34' extend from the cavity surfaces 2' of the evacuation tooling 14', 16' into the cavity 22' defined thereby. Upon closing of the evacuation tooling 14', 16' the fixed evacuation bars 34' are brought into contact with the blow molded container 10, applying pressure to the exterior of the container 10. In many respects, the fixed evacuation bars 34' are similar to the previously discussed slides 34 when the slides are in their fully extended position. The position and cross sectional shape of the fixed evacuation bars 34' is also of similar construction.

Figure 10:
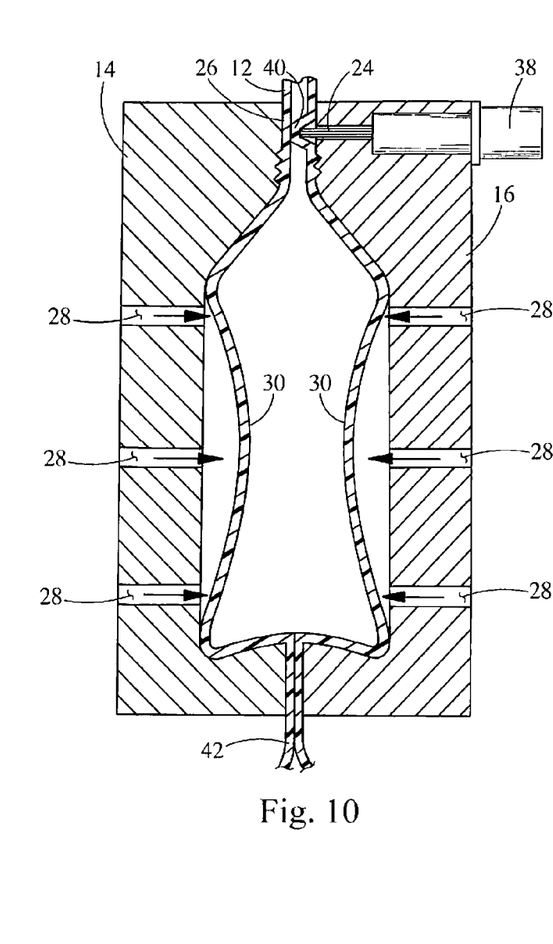
FIG. 10 is a sectional view illustrating one method of sealing the blow molded container.

Referring to FIG. 10, after a portion of the blow air has been evacuated from the container 10, one or more sealing tools 24 is extended to form a seal 40 in the sealing neck portion 26. For convenience, the construction and operation of the sealing tool 24 is provided only in connection with the first embodiment of the first construction of the invention. Persons of skill in the art will readily appreciate the applicability on of the sealing to the other embodiments, including those of the second construction of the invention.

As seen in FIG. 10, the sealing tool 24 is reciprocally driven by an actuator 38, which can be pneumatic, electric, mechanical or otherwise driven. In the retracted position, the sealing tool 24 does not extend into the neck portion of the mold cavity 22, as shown in FIGS. 1-8. The sealing tool 24 is not actuated until there has been an appropriate evacuation of blow air from the container 10. Extension of the sealing tool 24 pushes the thermoplastic resin of one side of the neck portion 26 of the container 10 toward the resin of the other side of the neck portion 26. The sealing tool 24 continues to be advanced and causes the opposing sides of the neck portion 26 to adhere together forming the seal 40.

Figure 11:
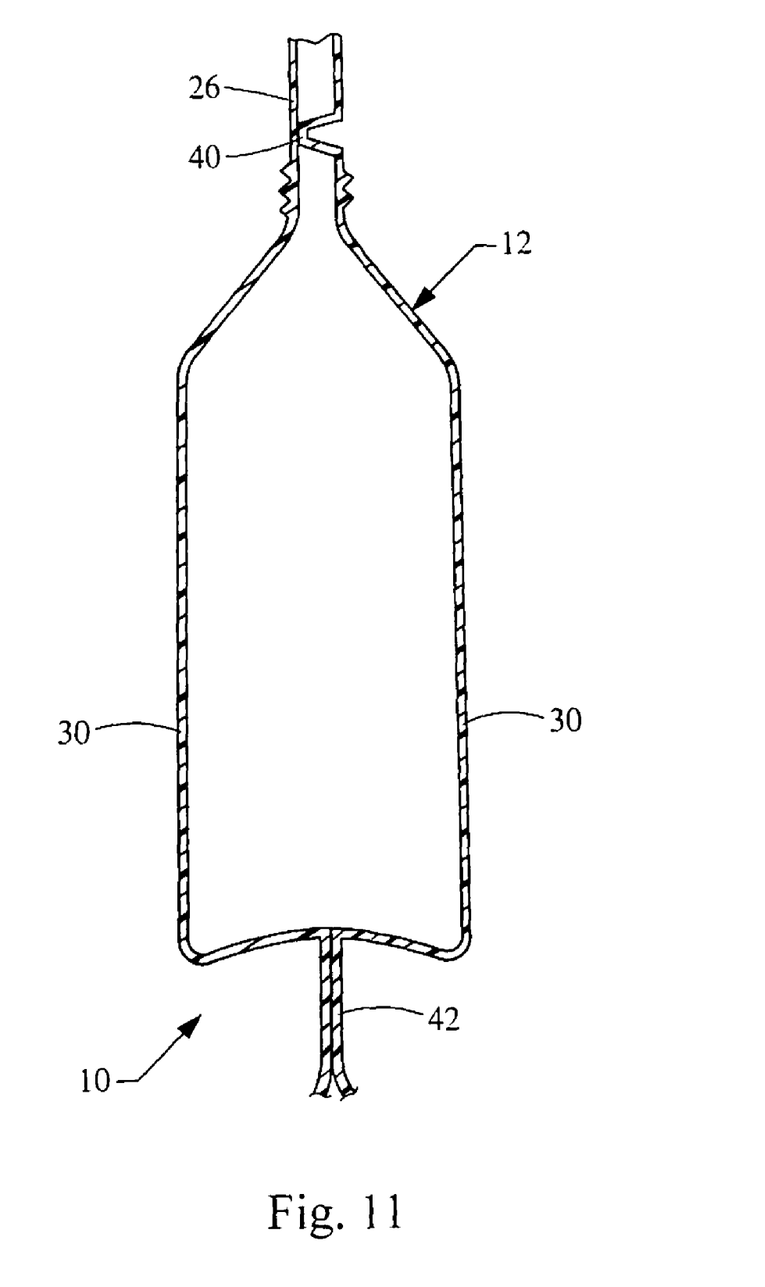
FIG. 11 is a sectional view of the blow molded container after being removed from the mold assembly and allowed to cool.

The sealing tool 24 is left in the extended position until the collapsed and compressed molten plastic has cooled to the point where the sealing tool 24 can be withdrawn without damage to the newly formed seal 40. Once the seal 40 is formed, the sealing tool 24 is retracted back to the position shown in FIGS. 1-8, the mold halves 14, 16 are separated and the container 10 is removed from the mold cavity 22. Removed from the mold cavity 22, the container 10 is allowed to cool. As the container 10 cools, it shrinks and may warm the air within the container 10. Because of the retained volume of air in the container 10, the shrinking of the container causes the side walls 30, a relatively weak portion of the container 10, to move outward to the desired shape of the resulting container 10, as seen in FIG. 11. Similarly, if the air in the container is warmed increasing its volume to any significant extent, this too can be accommodated via the amount of the deflection induced during evacuation of the container 10.

In the molding of the container 10 through an extrusion blow molding operation, the parison 12 is first extruded between open mold halves 14, 16, as shown in FIG. 1. The mold halves 14, 16 are closed to capture a portion of the parison 12 within the mold cavity 22, as shown in FIG. 2. Upon closing, the mating surfaces of the mold halves 14, 16 clamp onto the parison 12 sealing the bottom and causing the formation of flash 42 integral with the captured parison 12.

Once the mold halves 14, 16 have been closed, sterile blow air, at a pressure of approximately 80-120 pounds per square inch, is caused to flow into the interior of the parison 12 to inflate the parison 12 against the inner surfaces 18, 20 of the mold halves 14, 16 to form the container 10 into the shape of the cavity 22. The blow air holds the expanded plastic in intimate contact with the inner surfaces 18, 20 of the mold halves 14, 16, which cause the plastic to begin to cool from the outer surface (or skin) of the container 10 inward. After blowing, the high pressure air is vented from the interior of the container 10. This venting and/or expansion of the high pressure air causes the residual air in the container 10 to be cooled During or after exhausting of the container 10 in the mold cavity 22, the sides 30 of the container 10 are deflected inward to reduce the interior volume of the container 10 and to force the evacuation of a portion of the residual blow air from the interior of the container 10. The reduction in the volume of the blow molded container is anticipated to generally be in an amount that produces an interior volume substantially equal to the desired final interior volume of the container 10. One such method and mechanism for evacuating the container is the use of pressurized air forced into the mold cavity 22 and between the surfaces thereof and the exterior surfaces of the container 10, through air passages 28, as shown in FIGS. 3 and 4. Another such method and mechanism is through the use of a moveable slide 32 that engages the sides 30 of the container 10, as shown in FIGS. 5 and 6. Still another method uses an inflatable membrane 48 that engages the sides 30 of the container 10, as shown in FIGS. 7 and 8. Thus it is seen that the method and mechanism used to flex the sides of and evacuate the container 10 can be of a varied type and design.

Once the desired amount of the residual blow air has been evacuated from the container 10, the container 10 is sealed at 40 by the sealing tool 24, capturing sterile air within the container 10, and then removed from the mold cavity 22. As the plastic of the container 10 cools it shrinks. Typical shrinkage is in the range of about ½ to 1% and all shrinkage is typically completed within 10 minutes after the container has been removed from the mold assembly. As the size of the container shrinks, the sealed volume remains the same (or increases if the air in side warms) and the sides 30 of the container 10 are caused to flex back to the desired container shape as typically defined by the shape of the mold cavity 22.

As noted throughout the above discussion, the volume of the container 10 at the time of sealing is selected such that when the container 10 cools to ambient temperatures, the interior volume of the container 10 (including any expanded residual air inside the container) and its shape will be the desired final shape and volume of the container 10, specifically the shape and volume defined by the mold cavity surfaces. Those skilled in the art will recognize that volume provided for in the initial sealed container 10 will depend on the specifics of the particular container 10 including wall thickness, geometry, parison temperature and residual blow air temperature.

The foregoing discussion discloses and describes various aspects of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

What is claimed is:

1. An apparatus for blow molding sealed aseptic containers, said apparatus comprising:
    a pair of mating mold halves including inner surfaces that when closed define a mold cavity;
    a first source of pressurized air connected to provide blow air to an interior of a parison located within the mold cavity so that supply of blow air to the interior of a hot resin parison captured within the cavity is effective to expand the parison to form a blow molded container conforming to the shape of the mold cavity;
    an evacuation device for applying force to the exterior of the blow molded container while the temperature thereof is above ambient temperature to deform the blow molded container to reduce the internal volume thereof and force a portion of pressurized air to be evacuated from the interior of the blow molded container, the amount of reduction of interior volume of the container effective to produce a sealed container that, at ambient temperature, that has the interior volume and shape defined by the mold cavity; and
    a sealing tool being movable between a first position and a second position, the sealing tool being moveable into the second position while the volume of the blow molded container is reduced by the evacuation device thereby sealing the blow molded container with the reduced internal volute to retain residual blow air therein.

2. The apparatus of claim 1 wherein the evacuation device further comprises a plurality of air passages in fluid communication with the mold cavity, a second source of pressurized air coupled to the air passages adapted to deliver pressurized air to the mold cavity between the inner surfaces and the blow molded container therein.

3. The apparatus of claim 2 wherein the second source of pressurized air is not a source of sterile pressurized air.

4. The apparatus of claim 2 wherein the first source of pressurized air is a source of sterile pressurized air.

5. The apparatus of claim 1 wherein the first source of pressurized air is a source of sterile pressurized air.

6. The apparatus of claim 1 wherein the evacuation device comprises at least one moveable slide for deforming a blow molded container when the slide is in an extended position, the device further including an actuator coupled to move the slide between a retracted position and an extended position.

7. The apparatus of claim 6 wherein the slide is mounted within one of the mold halves and has a distal end with a surface contoured to match the inner surface of the mold cavity.

8. The apparatus of claim 7 wherein, in the retracted position, the distal end of the slide is flush with the inner surfaces of the mold cavity and in the extended position the slide is extended into the mold cavity to a position deforming the blow molded container therein.

9. The apparatus of claim 1 wherein the evacuation device comprises at lease one inflatable membrane for deforming a blow molded container when the inflatable membrane is inflated and a second source of pressurized air coupled to the inflatable membrane to deliver pressurized air to the inflatable membrane.

10. The apparatus of claim 9 wherein when the inflatable membrane is not inflated the inflatable membrane is flush with surfaces contacting the blow molded container and when the inflatable membrane is inflated by pressurized air from the second source, the membrane extends so as to deform the blow molded container.

11. The apparatus of claim 1 wherein the evacuation device is part of an evacuation station separate from a molding station.

12. The apparatus of claim 11 wherein the evacuation device includes evacuation tooling having cavity surfaces defining a cavity configured to receive the blow molded container therein.

13. The apparatus of claim 12 wherein at least one of the cavity surfaces include a portion projecting therefrom into the cavity, the portion being of a size to cause deformation of the blow molded container when the evacuation tooling is closed about the blow molded container.

14. The apparatus of claim 1 wherein the evacuation device is located in a position on at least one of the mold halves such that the device defines a surface corresponding to at least a portion of a side wall of the container defined by the mold cavity.

* * * * *